Dec. 21, 1937.                A. PICHUCKI                2,103,089
AUTOMOBILE BRAKE CONTROLLING DEVICE
Filed Feb. 27, 1937

ANTONI PICHUCKI.
INVENTOR.

BY Louis Chayka

ATTORNEY.

Patented Dec. 21, 1937

2,103,089

UNITED STATES PATENT OFFICE 2,103,089

AUTOMOBILE BRAKE CONTROLLING DEVICE

Antoni Pichucki, Sydney, Nova Scotia, Canada

Application February 27, 1937, Serial No. 128,213

1 Claim. (Cl. 70—202)

Specifically, my invention consists of a device to control the operation of the brakes in automobiles, and the purpose of my invention is to provide means acting upon said brakes whereby it will be possible to apply the brakes to the wheels of the automobiles, to lock said brakes in the braking position, and thus to prevent unauthorized persons from operating and driving away any automobile provided with my brake locking device.

The means invented by me for that purpose are of a very simple construction and are designed so that they may be installed in all cars. They are easily manipulated and yet efficient, as the device employed by me will make the unauthorized driving away of cars difficult. This will undoubtedly discourage unauthorized individuals from tampering with automobiles belonging to other persons.

I will now describe my invention with reference to the accompanying drawing, in which:

Fig. 1 presents the side elevation of my device, the view being partly sectional, with reference to the braking pedal as installed in an automobile.

Similar numerals refer to similar parts throughout the several views.

Figure 1:
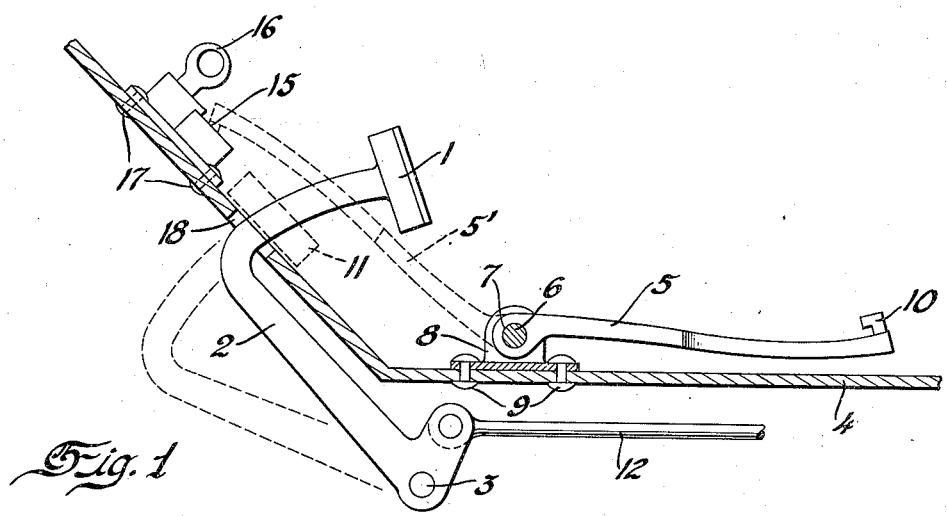
Figure 2:
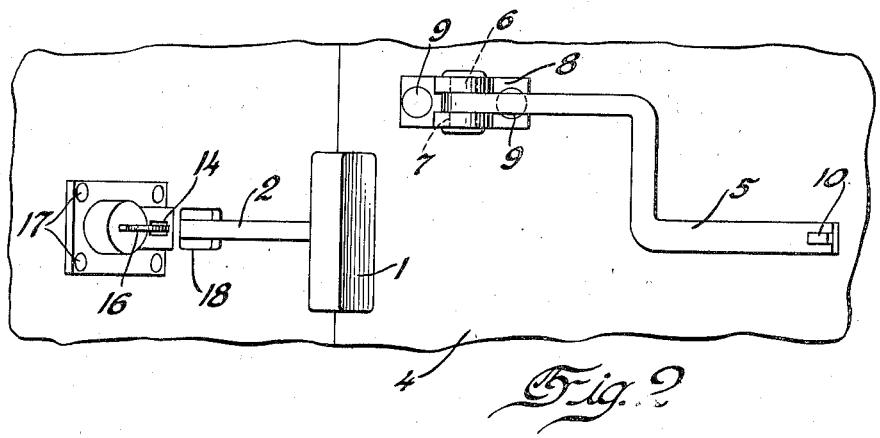
Fig. 2 shows a top plan view of my device.

Since the average automobile is already provided with very efficient braking equipment, I have, therefore, thought it advisable to apply said braking equipment in combination with my device, for the purpose of effecting the aims contemplated by me. My device, therefore, is installed so that it may make use of said braking system. For that purpose, I have installed my device in proximity to the braking pedal 1, mounted upon the braking lever 2 pivotally mounted at 3 upon the frame of the automobile or other support. 4 is the floor of the automobile and 18 is a slot-shaped opening in the floor to accommodate the lever 2. Placed in operative proximity to said braking pedal 1, my device consists principally of an elongated member 5, at one end provided with an integral cross-pin 6, held in the bearings 7 of the pillow block 8. Said block 8 is riveted to the floor 4 by rivets 9. The other end of the said member 5 is provided with a locking jaw 10. Ordinarily the location of my device on the floor below the brake would interfere with the free movement of the foot of the person operating the automobile and with the attempt to apply the brakes, and, therefore, to avoid this interference, I have placed the block 8 somewhat to one side of the braking pedal and have designed the member 5 in a crank-like shape so that although the block 8 is located in a plane different from that of the braking pedal, yet the locking end of the member 5, bearing the jaw 10, is adapted to swing over the braking pedal 1 in the same plane as that of the braking pedal. It is obvious that this design of the locking member 5 is not essential as the member 5 with its supporting block 8 may be located above the brake pedal and work in a reverse direction, that is downward, or it may be placed to one side of the pedal and swing over the pedal transversely. I believe, however, that the arrangement shown in Fig. 1 is the one that is most convenient and desirable.

Figure 3:
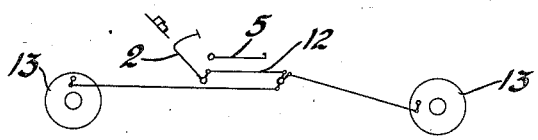
Fig. 3 shows a diagrammatic view of my device as installed in an average automobile in combination with the braking arrangement therein.

Fig. 1 shows the normal position of the braking pedal, also the normal position of my locking device. When it is desired that the brakes be set, member 5 is swung over the top of the braking pedal 1 to a position shown in dotted line 5', and depresses it to the position 11 also shown in dotted outline. The pedal acts upon the braking lever 2, applies the brakes by means of the braking rod 12, transmitting the movement to the brake drums 13, shown in Fig. 3, in the conventional and well known manner. The jaw 10 of the bar 5 fits into a recess 14 in the lock 5, controlled by a removable key 16 and is held therein securely until unlocked. Said lock is securely riveted to the floor of the automobile by rivets 17. When the bar 5 is in this position, over the top of the braking pedal 1, the brakes are set in a braking engagement with the wheels of the car and interfere with the free movement of the automobile. In order to release the brakes, it will be necessary for someone, presumably the owner of the car, to unlock the lock 15 when the locking bar 5 may be swung back to its original position, in order to release the braking pedal 1, which then would rise to its normal position as shown in Fig. 1.

It is obvious that the idea of my invention may be subject to many changes without departing from the spirit of my invention. What I am claiming, therefore, is:

In a vehicle equipped with a pedal controlled braking system, a device to lock the brake pedal in a braking position, comprising a base to one side of the pedal and rearwardly thereof, a crank-shaped locking member hinged therein and comprising a hinged base portion and laterally offset pedal-engaging portion, provided with means to interlock with locking means above said pedal, said crank-shaped locking member being mounted in such a way as to leave foot space in front of the pedal free of any obstructions.

ANTONI PICHUCKI.